(12) United States Patent
Mesher et al.

(10) Patent No.: US 7,575,690 B2
(45) Date of Patent: *Aug. 18, 2009

(54) RECYCLING HYDROCARBON HYDRAULIC STIMULATION FLUID

(75) Inventors: Shaun T. Mesher, Calgary (CA); Amanda G. Jarvis, Kent (GB)

(73) Assignee: Synoil Fluids Holdings Inc., Calgary, Alberta (CA)

( * ) Notice: Subject to any disclaimer, the term of this patent is extended or adjusted under 35 U.S.C. 154(b) by 332 days.

This patent is subject to a terminal disclaimer.

(21) Appl. No.: 11/422,948

(22) Filed: Jun. 8, 2006

(65) Prior Publication Data

US 2007/0284311 A1    Dec. 13, 2007

(30) Foreign Application Priority Data

Jun. 5, 2006   (CA) .................................. 2550382

(51) Int. Cl.
  *B01D 17/02*   (2006.01)
  *B01D 17/05*   (2006.01)
(52) U.S. Cl. .................... 210/708; 166/267; 166/308.4; 210/712; 210/724; 210/737; 210/799; 507/922
(58) Field of Classification Search ................. 210/708
See application file for complete search history.

(56) References Cited

U.S. PATENT DOCUMENTS

| 4,191,651 | A | * | 3/1980 | Cheysson et al. | 210/265 |
| 4,436,635 | A | * | 3/1984 | Abrams et al. | 210/806 |
| 4,701,271 | A | * | 10/1987 | Thach et al. | 507/277 |
| 5,093,006 | A | * | 3/1992 | Kalnins | 210/704 |
| 5,354,477 | A | * | 10/1994 | Rush | 210/708 |
| 5,567,318 | A | * | 10/1996 | Beall | 210/691 |
| 6,491,824 | B1 | * | 12/2002 | Lin et al. | 210/666 |
| 6,875,728 | B2 | * | 4/2005 | Gupta et al. | 507/240 |
| 6,913,080 | B2 | * | 7/2005 | Lehman et al. | 166/252.3 |
| 7,314,850 | B2 | * | 1/2008 | Taylor et al. | 507/238 |
| 2004/0200616 | A1 | * | 10/2004 | Chatterji et al. | 166/267 |

* cited by examiner

*Primary Examiner*—Peter A Hruskoci
(74) *Attorney, Agent, or Firm*—Bennet Jones LLP

(57) ABSTRACT

Hydrocarbon stimulation fluids are often used to increase the permeability and productivity of oil and gas reservoirs. The fluid itself is made up of a mixture of hydrocarbons and various chemicals designed to induce gel formation and gel breaking. The successful removal of these chemicals from the fluid has been achieved, through a process of acid-washing and filtration. This will allow the fluid to be re-used many times for further fracturing processes.

17 Claims, No Drawings

RECYCLING HYDROCARBON HYDRAULIC STIMULATION FLUID

BACKGROUND

Stimulation fluids are used to create additional permeability in oil and gas reservoirs. This is achieved by pumping the fluid (hydrocarbon or water), down hole. While this is happening three chemicals are mixed at the surface and blended into the fluid to create viscosity, also known as a gel state. The chemicals include a gelling agent, an activator and a breaker. For many hydrocarbon fluids the gelling agent is phosphate ester, the activator is an iron base chemical and the breaker is a basic metal oxide.

The viscous fluid is pumped at high rates down hole and is forced into the hydrocarbon reservoir under high pressures. Once the fluid pressure is greater than the rock pressure, the fluid creates a fracture in the rock and flows into the fracture. As this is happening, sand is then added and pumped downhole to stabilize the fracture and provide porosity.

As the fracture stimulation ends, the breaker chemical in the fluid begins to degrade (or break) the gel, which brings the viscosity down to pre gel levels. Once the hydrocarbon fluid is broken, the fluid (termed flow back) is then brought to surface and subsequently sent to oil recyclers for clean-up and sold back into the crude oil system.

Recycling of hydrocarbon fracturing fluids has been limited. Typically a company will reuse the fluid and increase the concentration of all the chemicals used to create and break the gel. This can occur only a limited number of times before the fluid becomes too unstable to create a usable gel system. Previous industrial efforts have used lime to remove residual gels at surface that have not broken. Heating and filtering have also been used to clean the hydrocarbon flow back and remove any solid particles such as sand and clay.

SUMMARY

There is provided a method of treating used hydrocarbon fracturing fluid to make it more readily recycled. The hydrocarbon fracturing fluid comprises activator and breaker chemicals used for making and breaking a gel. The hydrocarbon fracturing fluid is contacted with an aqueous acid to react the activator and breaker chemicals with the aqueous acid and produce a fluid with a hydrocarbon phase and an aqueous phase containing reaction products of the aqueous acid with activator and breaker chemicals. The aqueous phase is separated from the hydrocarbon phase to produce a recyclable hydrocarbon fracturing fluid. There is also provided a method of removing gelling agents from a hydrocarbon fracturing fluid by filtering the hydrocarbon fracturing fluid either through a clay or a fine filter. Various others aspects of these processes are also described and claimed here.

DETAILED DESCRIPTION

Removal of two of the three main gellant system chemicals in a hydrocarbon fracturing fluid, the activator and breaker, is described. Filtration of the hydrocarbon fracturing fluid with a significant reduction of gelling agent is also described. These processes individually, and also collectively, make the hydrocarbon fracturing fluid reusable to fracture with. The three main chemicals contained in the used fracturing fluid for gelling are the gelling agent, which is typically a phosphate ester and is slightly acidic, the activator, which is an iron or aluminum complex and is a lewis base, and the breaker, which is a basic metal oxide.

The hydrocarbon fracturing fluid is contacted with an aqueous acid. The aqueous acid reacts with a activator and breaker chemicals in the hydrocarbon fracturing fluid to produce a fluid with a hydrocarbon phase and an aqueous phase. The aqueous phase contains reaction products of the aqueous acid with activator and breaker chemicals. In one embodiment, the hydrocarbon fracturing fluid is contacted with aqueous acid in an amount by weight of the hydrocarbon fracturing fluid between 0.5-5%, preferentially between 0.5-2% to remove the two basic chemicals, the activator and the breaker. Examples of suitable aqueous acids are hydrochloric acid, sulfuric acid, sulfamic acid, ortho-phosphoric acid, pyro phosphoric acid and phosphoric acid. Other acids, such as organic acids, may also be used.

In one embodiment of the process, 85% phosphoric acid is mixed into used hydrocarbon fracturing fluid in a concentration of 0.5% to 2% by weight of the hydrocarbon fracturing fluid, and the mixture is heated to 30° C. to 40° C. for 30-40 minutes while mixing. The acidic aqueous layer is then separated from the acid and hydrocarbon fracturing fluid mixture, for example by draining off the aqueous layer from the hydrocarbon fracturing fluid. Other separation techniques may be used, but draining is sufficiently effective. The aqueous layer may be disposed of in conventional manner for example by downhole injection, and the treated hydrocarbon fracturing fluid may be recycled in a fracturing process. After acid treatment, the activator may be reduced by 99.96% and the breaker may be reduced by 99.93%.

In one embodiment, the hydrocarbon fracturing fluid is also filtered through one or more filtering steps, using a filter, for example a clay filter, such as montmorillonite or a filter with a pore diameter less than or equal to 1 μm, which reduces the slightly acidic gel. The filters should be selected to remove at least some of the gel, which for some gelling agents may require a clay filter. After treatment by filtration the proportion of gelling agent in the hydrocarbon fracturing fluid may be reduced by as much as 90%, and the hydrocarbon fracturing fluid may be recycled.

EXPERIMENTAL

A test procedure was carried out as follows: A 200 ml sample of used SF-800 hydrocarbon fracturing fluid for the tests shown in the first table following and TG-740 fracturing fluid for the tests shown in the second table following (both fluids being obtained through SynOil Fluids, Calgary, Alberta. Canada) were stirred, heated to 40°C. and stirred for 30 minutes. Various chemicals as indicated below in the tables were added before the stirring took place. The treated hydrocarbon fluid was then filtered and any aqueous layers separated. The hydrocarbon fluid was analyzed by ICP and the ppm levels of various metals recorded. The phosphate gel is characterized by the phosphate metal levels, the breaker is characterized by the magnesium metal levels and the activator is characterized by the iron metal levels. All results are reported in ppm.

| Levels of metals (ppm) | P | Mg | Fe |
|---|---|---|---|
| 1. Untreated used SF-800 | 112 | 64 | 250 |
| 2. Heat + filter (1 μm filter) | 63 | 4.4 | 50 |
| 3. Heat + filter (montmorillonite) | 30 | 0.6 | 30 |
| 4. Heat + 1% H3PO4 + filter (1 μm) | 55 | 0.2 | 0.6 |
| 5. Heat + 1% H3PO4 + filter (montmorillonite) | 21 | 0.05 | 0.4 |
| 6. Heat + 0.9% H3PO4 + filter (montmorillonite) | 22 | 0.05 | 0.1 |
| 7. Heat + 1% HCl (35%) + filter (μm) | 56 | 1.7 | 12 |

-continued

| Levels of metals (ppm) | P | Mg | Fe |
|---|---|---|---|
| 8. Heat + 0.7% H3PO4 + filter (montmorillonite) | 19 | 0.1 | 9.6 |
| 9. Heat + 0.5% H3PO4 + filter (montmorillonite) | 14 | 0.05 | 0.2 |
| 10. Heat + 0.1% H3PO4 + filter (montmorillonite) | 6 | 1.9 | 0.7 |
| 11. Heat + 0.9% H3PO4 + filter (0.45 µm) | 98 | 7.3 | 33 |
| 12. Heat + 1% H3PO4 + filter (diatomaceous earth) | 137 | 23 | 108 |
| 13. Heat + 0.9% H3PO4 + filter (activated charcoal) | 162 | 11 | 33 |
| 14. Heat + 0.9% H3PO4 + filter (0.45 µm) | 153 | 9.7 | 32 |
| 15. Re-filter 14 + filter (0.45 µm) | 150 | 10 | 31 |
| 16. Re-filter 15 + filter (0.45 µm) | 118 | 5.5 | 14 |
| 17. Heat + 1% sulfamic acid + filter (montmorillonite) | 42 | 4.1 | 84 |
| 1. Untreated used TG-740 | 227 | 92 | 525 |
| 2. Heat + filter (1 µm filter) | 196 | 6.9 | 53 |
| 3. Heat + filter (1 µm) + filter (montmorillonite) | 20 | 0.2 | 5.7 |

Thus, a process for recycling hydrocarbon fracturing fluid is described. Two of the main chemical ingredients (the breaker and activator) used in the hydrocarbon hydraulic stimulation of an oil and gas formation may be reduced by over 99%. This is accomplished by mixing the hydrocarbon fracturing fluid with an aqueous acid, for example phosphoric acid in a concentration between 0.5%-2%. The amount of the third chemical (gelling agent) present is reduced by filtering the mixture through a clay such as montmorillonite.

Immaterial modifications may be made to the processes described here without departing from what is claimed.

What is claimed is:

1. A method of treating used hydrocarbon fracturing fluid, the hydrocarbon fracturing fluid comprising activator and breaker chemicals, wherein the activator chemical includes an iron or aluminum complex, and the breaker chemical includes a metal oxide, the method comprising the steps of:
    contacting the hydrocarbon fracturing fluid with an aqueous acid to react the activator and breaker chemicals with the aqueous acid and produce a fluid with a hydrocarbon phase and an aqueous phase containing reaction products of the aqueous acid with activator and breaker chemicals; and
    separating the aqueous phase from the hydrocarbon phase to produce a recyclable hydrocarbon fracturing fluid.

2. The method of claim 1 in which the aqueous acid is selected from a group consisting of: phosphoric acid, ortho-phosphoric acid, pyro-phosphoric acid, hydrochloric acid, sulfuric acid, and sulfamic acid.

3. The method of claim 1 in which the aqueous acid is phosphoric acid.

4. The method of claim 1 in which the aqueous acid is added at a concentration of between 0.5% and 5% by weight of the hydrocarbon fracturing fluid.

5. The method of claim 1 further comprising mixing and heating the hydrocarbon fracturing fluid during contacting of the hydrocarbon fracturing fluid with an aqueous acid.

6. The method of claim 1 in which contacting the hydrocarbon fracturing fluid is carried out at a temperature of between 30° C. and 40° C.

7. The method of claim 1 in which contacting the hydrocarbon fracturing fluid is carried out for between 30 minutes and 60 minutes.

8. The method of claim 1 in which separating the aqueous phase from the hydrocarbon phase comprises draining the aqueous phase.

9. The method of claim 1 further comprising filtering the hydrocarbon fracturing fluid to remove gelling agent from the hydrocarbon fracturing fluid.

10. The method of claim 9 in which filtering comprises passing the hydrocarbon fracturing fluid through a clay filter.

11. The method of claim 10 in which the clay is montmorillonite.

12. The method of claim 9 in which the filtering the hydrocarbon fracturing fluid comprises passing the hydrocarbon fracturing fluid through a filter having pore size less than or equal to 1 µm in diameter.

13. A method of treating used hydrocarbon fracturing fluid, the hydrocarbon fracturing fluid containing one or more gelling agents, including a phosphate ester, the method comprising the steps of:
    filtering the hydrocarbon fracturing fluid through a clay filter to remove the one or more gelling agents; and
    recycling the hydrocarbon fracturing fluid to a fracturing process.

14. The method of claim 13 in which filtering the hydrocarbon fracturing fluid comprises repeatedly passing the hydrocarbon fracturing fluid through the clay filter.

15. The method of claim 13 in which the clay filter is a montmorillonite filter.

16. A method of treating used hydrocarbon fracturing fluid, the hydrocarbon fracturing fluid containing one or more gelling agents, including a phosphate ester, the method comprising the steps of:
    filtering the hydrocarbon fracturing fluid through a filter having pore size less than or equal to 1 µm in diameter to remove at least a portion of the gelling agent; and
    recycling the hydrocarbon fracturing fluid to a fracturing process.

17. The method of claim 16 in which filtering the hydrocarbon fracturing fluid comprises repeatedly passing the hydrocarbon fracturing fluid through the filter.

* * * * *